(12) United States Patent
Duncan

(10) Patent No.: US 7,997,494 B2
(45) Date of Patent: Aug. 16, 2011

(54) PORTABLE DEVICE FOR STORING MEDIA CONTENT

(75) Inventor: Bruce Duncan, Bracknell (GB)

(73) Assignee: Koninklijke Philips Electronics, N.V., Eindhoven (NL)

( * ) Notice: Subject to any disclaimer, the term of this patent is extended or adjusted under 35 U.S.C. 154(b) by 1092 days.

(21) Appl. No.: 10/556,472

(22) PCT Filed: May 5, 2004

(86) PCT No.: PCT/IB2004/001526
§ 371 (c)(1),
(2), (4) Date: Nov. 10, 2005

(87) PCT Pub. No.: WO2004/102568
PCT Pub. Date: Nov. 25, 2004

(65) Prior Publication Data
US 2007/0056013 A1    Mar. 8, 2007

(30) Foreign Application Priority Data
May 13, 2003  (GB) .................................. 0310929.5

(51) Int. Cl.
*G06F 17/00* (2006.01)
*G06K 5/00* (2006.01)
(52) U.S. Cl. .................................. 235/472.01; 235/375
(58) Field of Classification Search .................. 235/375, 235/472.01; 725/32
See application file for complete search history.

(56) References Cited

U.S. PATENT DOCUMENTS

| | | | |
|---|---|---|---|
| 6,389,538 B1 * | 5/2002 | Gruse et al. | 713/194 |
| 6,571,285 B1 * | 5/2003 | Groath et al. | 709/223 |
| 6,581,039 B2 * | 6/2003 | Marpe et al. | 705/7 |
| 6,671,692 B1 * | 12/2003 | Marpe et al. | 1/1 |
| 2002/0108109 A1 * | 8/2002 | Harris et al. | 725/32 |
| 2003/0023427 A1 | 1/2003 | Cassin et al. | |

FOREIGN PATENT DOCUMENTS

| | | |
|---|---|---|
| JP | 11-288557 | 10/1999 |
| JP | 2002150673 A | 5/2002 |
| JP | 2002150759 A | 5/2002 |
| JP | 2005507130 A | 3/2005 |
| WO | 2000060918 A2 | 10/2000 |
| WO | 2003008060 A1 | 1/2003 |
| WO | 2003036541 A1 | 5/2003 |

* cited by examiner

*Primary Examiner* — Thien M Le

(57) ABSTRACT

A portable device has a storage medium for storing media content such as audio and video files. The portable device can communicate with an external media player or network when it is connected to the player or situated near the player. The external media player allows a user to select items of media content for presentation. Each time a user selects a new item of media content for presentation on the external media player, a copy of the selected media content is automatically transferred to the storage medium on the portable device. Thus, when the user removes the portable device from the external media player, the user has a history of his/her recent selections as well as copies of his/her recent selections stored on the portable device.

23 Claims, 6 Drawing Sheets

PORTABLE DEVICE FOR STORING MEDIA CONTENT

This invention relates to portable devices for storing media content, media players for presenting media content and to control apparatus, methods and software for controlling transfer of media content between media players and portable devices.

There is considerable consumer interest in portable devices which can store and play media content such as audio tracks and video files. These devices allow the user to enjoy their favourite media content while they are away from their home or place of work. While portable devices have historically only played pre-recorded media, or user recorded media, such as compact discs, there is an increasing trend for portable devices to include a rewriteable storage medium such as a solid state memory or hard drive such that a user can directly store media content of their choice on the device and change the content at a later date. More efficient media coding schemes such as MPEG Layer-3 (MP3) audio coding and the decreasing cost of high capacity storage media have allowed portable devices of this kind to store a useful quantity of content.

One of the most common ways of storing media content on a portable device is as follows. A user selects, on their computer (PC), audio or video files which they wish to download to the portable device. The audio or video files may already be stored on the computer or they may be downloaded to the PC from external sources such as internet servers. Once selected, the files are downloaded to the portable device via a cabled or wireless connection between the PC and portable device. The content files are locally stored on the portable device and the user is free to carry the device to another location and enjoy the media content at their leisure.

A disadvantage of this arrangement is that a user needs to spend a considerable amount of time actively selecting and supervising the transfer of media to the portable device.

The present invention seeks to provide an improved way of managing transfer of media content to portable devices.

Accordingly, a first aspect of the invention provides control apparatus for a portable device for storing media content, the portable device having a storage medium for storing media content and means for communicating with a media player external to the device, the control apparatus being arranged to:

determine when a user selects a new item of media content for presentation by the external media player; and, request a copy of the user-selected media content to be transferred to the storage medium on the portable device.

This has the advantage that when a user removes the portable device from the environment of the media player they automatically have a history of their recent selections of items on the media player stored on the portable device. Thus, the user can listen to, or view, their recent selections while they are located away from the media player without any need to actively supervise the transfer of those items to the portable device.

The portable device can take many forms: it can be a dedicated media storage device with or without the capability of rendering the stored media content into a form for presentation to a user, such as an MP3 player or similar device, or it can be a multi-functional device with media storage and rendering capabilities, such as a personal digital assistant (PDA), portable computer or mobile telephone. The size of the device is unimportant.

In order to determine when a user selects a new item of media content for presentation on the external media player the portable device can periodically poll the external media player or it can receive a notification from the media player.

Preferably the control apparatus determines whether a copy of the user-selected media content is already stored on the portable device and a copy of the user-selected media content is only stored if a copy is not already stored on the portable device. This allows the best use to be made of the limited storage resources on the portable device.

Preferably, the control apparatus is arranged to transfer a complete copy of the user-selected item of media content, regardless of the amount of that item sampled by the user on the external player. As an example, if a user decides to listen to a short segment of an audio track on the media player, the control apparatus will attempt to transfer a full copy of the entire audio track. This ensures that the portable device has a full copy of the item should the user decide to move the portable device without notice. Indeed, preferably the control apparatus is arranged to transfer the user-selected media content at a rate which is greater than that at which it is presented on the external player. The transfer rate could be several orders of magnitude greater, but this will depend on the bandwidth of the communication link between the media player and portable device.

Preferably the control apparatus is operable to determine when the portable device is removed from the external player and to begin presenting the media content which had been selected on the external player. More preferably, the control apparatus is arranged to determine the position at which the external player was presenting the selected media content at the time that the portable device was disconnected and to begin presenting the media content on the portable device at substantially the same position.

Preferably the storage medium comprises a temporary buffer for storing a limited number of items of media content and the control apparatus is arranged to store the items in the buffer on a time ordered basis, such as a first-in, first-out basis. Preferably, a user's selection of an item which is already stored on the portable device increases the longevity of that item in the buffer so that there is an increased chance of the user finding their favourite items in the buffer.

Alternatively, or additionally, to storing items on a time-ordered basis, a priority can be assigned to items stored in the buffer. The priority of an item can be made dependent on the type of media content (audio, video etc.) or a rule specified by a user.

Another aspect of the invention provides a portable device for storing media content comprising a storage medium for storing the media content and a control apparatus of the type described above. The storage medium may form an integral part of the portable device, such as memory chips internal to the device, or the storage medium may be readily removable from the remainder of the portable device, such as a removable memory card, miniature hard-drive or magneto-optical disc. The control functionality can be separate from the storage medium or form an integral part of the storage medium. Preferably, the portable device further comprises means for rendering the stored media content into a form for presentation to a user.

A further aspect of the invention provides a control apparatus for a media player which is capable of presenting media content to a user, the media player being co-operable with a portable device having a storage medium for storing media content and having means for communicating with the portable device, the control apparatus being arranged to:

determine when a user selects a new item of media content for presentation by the media player; and, cause a copy of the user-selected media content to be transferred to the storage medium on the portable device.

In order to determine whether it needs to transfer a copy of the user-selected media content to the portable device, the control apparatus can maintain an inventory of media content on the portable device. The selected item of media content need only be automatically copied to the portable device if the selected item does not appear in the inventory. This requires the control apparatus to have an up-to-date inventory. Alternatively, in response to determining that a user has selected a new item of media content, the control apparatus can send the portable device an identifier of the new item. The portable device refers to its own inventory to decide whether it needs a copy of the newly selected item and sends an appropriate message to the control apparatus of the media player. A copy of the selected item is only sent to the portable device if it requests a copy.

The control apparatus for the media player can physically reside on the media player or it can be physically separate from the media player and communicate with the media player by a cabled or wireless connection.

Preferably, the control apparatus determines whether a complete copy of the user-selected item of media content is available since some types of content, such as broadcast or streamed data, may not be stored locally on the media player. Preferably, the control apparatus determines whether a complete copy of the user-selected item of media content is available from an alternative source to that currently being used. If an alternative source cannot be found, the user-selected item of media content can be transferred to the portable device at substantially the same rate at which it is received from the source or presented on the media player. Alternatively, an identifier of the item can be sent to the portable device.

This feature of automatically transferring copies of selected items to a portable device could be a permanent feature of the media player and portable device or, more preferably, it can be turned on or off by a user by being presented as one of the user-defined preferences of the media player and portable device.

A further aspect of the invention provides a media player which includes a control apparatus of the type just described. The media player can take many forms: it can be a dedicated player such as a CD or DVD player, a multi-purpose device such as a PC with storage and rendering facilities which allow it to be used as a media player, or it can be a network of devices which together achieve the function of storing or obtaining media content and presenting it to a user.

Further aspects of the invention provide methods for controlling operation of a portable device or media player.

This manner of controlling the transfer of media content to a portable device can be implemented in software which is executed by processors in the media player and/or the portable device. Accordingly, further aspects of the invention provide software for controlling operation of a portable device or media player.

Embodiments of the present invention will now be described, by way of example only, with reference to the accompanying drawings, in which.

Figure 1:
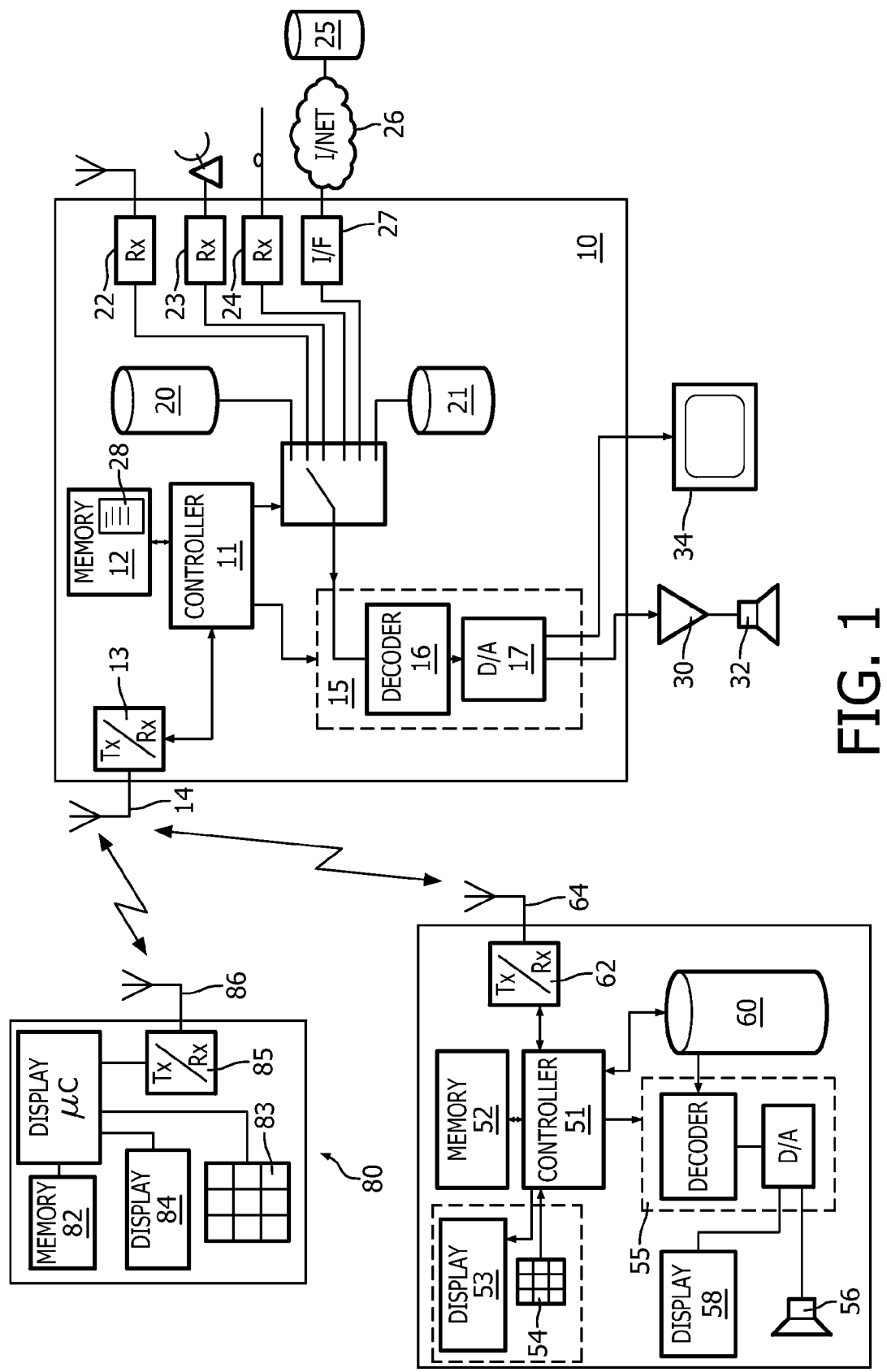
FIG. 1 shows a home entertainment system embodying the invention.

FIG. 1 shows an entertainment system which is suitable for use in a home or public place. The main components of the system are a device 10, or network of devices, which can play media content (hereinafter called a media device), a remote control unit 80 by which a user can control the media device or network 10, and a portable device 50 which a user can freely move into and out of the environment of the media device 10.

Media device 10 has a controller 11, such as a microprocessor, for controlling operation of the device. The microprocessor has one or more memory devices 12 connected to it for storing the operating software for the media device 10, and any user-defined preferences for operating the device, in a manner which will be well understood.

The media device 10 also comprises one or more storage devices 20, 21 for storing media content. These storage devices can include: solid state memory devices 20 such as flash memory; high capacity hard-drives; players 21 for playing optical disks, such as compact discs or Digital Versatile Discs (DVDs), which a user inserts into the player as they desire and drives for reading/writing magneto-optical storage devices such as Sony Minidisc™. In addition, the media device 10 receives inputs from external sources of broadcast media via a terrestrial broadcast receiver 22, satellite broadcast receiver 23 and cable broadcast receiver 24. Furthermore, the media device 10 can access external sources of media content 25 via an interface 27 to an internet connection 26. Interface 27 can take the form of a modem. External sources 25 can include servers holding databases of audio and video files, or servers which can deliver streamed audio and video content.

It will be appreciated that in FIG. 1 media device 10 is shown as being the hub of a well-equipped home entertainment system, with access to a wide range of different sources of media content. However, media device 10 need not be this elaborate and, in its simplest form, media device 10 can have just a single store of media content, or access to a single source of media content.

Media device 10 also comprises reproduction unit 15 to reproduce, or render, selected items of the media content. This includes appropriate decoders 16 for decoding the media content (such as an MP3 audio decoder and MPEG2 video decoder), a digital to analogue converter 17. Audio and video outputs from the reproduction unit 15 are fed to amplifiers 30 and speakers 32 for providing an audible output and a visual display 34, such as a television monitor, for providing a visual output. It will be appreciated that the amplifiers 30, speakers 32 and display 34 can be integrated with the media device 10 or separate from them, as shown in FIG. 1.

A wireless remote control unit 80 is provided for allowing a user to control operation of the media device 10. This comprises a microprocessor 81 and memory 82, a user input device 83 for allowing a user to make selections, a display 84 for displaying to the user the current operating conditions and selections and a transmitter/receiver 85 and antenna 86 for communicating with a similar unit 13, 14 on the media device 10. The user input device 83 can be a simple keypad, or it can be a more complex device such as a touch-sensitive screen which is combined with the display 84, with context-sensitive labels and 'soft buttons' displayed on the display 84 under the control of microprocessor 81.

Portable device 50 represents a portable unit which can be moved around with a user. It may be a small, hand-held, device or something larger. In this embodiment, the portable device 50 comprises a controller 51 and memory 52 for controlling operation of the device, a user interface with a display 53 and input device 54. A storage device 60 stores media content and reproduction of the media, under the control of controller 51, is performed by reproduction or rendering equipment 55 such as audio and video decoders. User outputs include one or more of audio speakers 56, a headphone output and a display 58. The main display 58 for rendering media content may be combined with the user-interface display 53. A transmitter/receiver 62 and antenna 64 allow the portable device to communicate in a wireless manner with the media device 10. As with the remote control 80, the user input device can be a simple keypad, or it can be a more complex device such as a touch-sensitive screen which is combined with the display 53, with context-sensitive labels and 'soft buttons' displayed on the display 53 under the control of microprocessor 51. The portable device 50 derives power from a battery in the device.

Operation of the system according to a first embodiment of the invention will now be described with reference to FIGS. 2-6.

Figure 2:
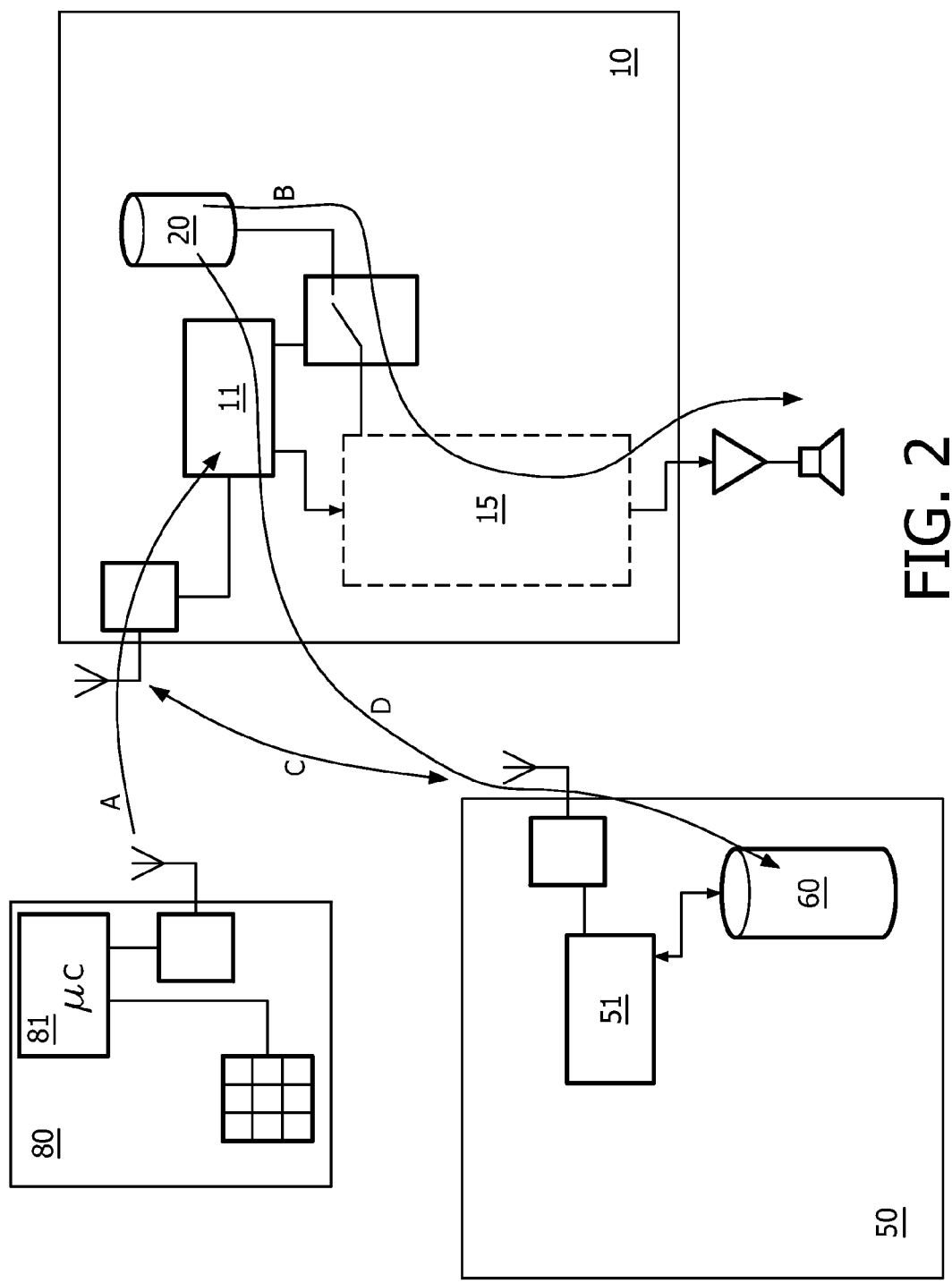
FIG. 2 shows communication flows across the system.
Figure 3:
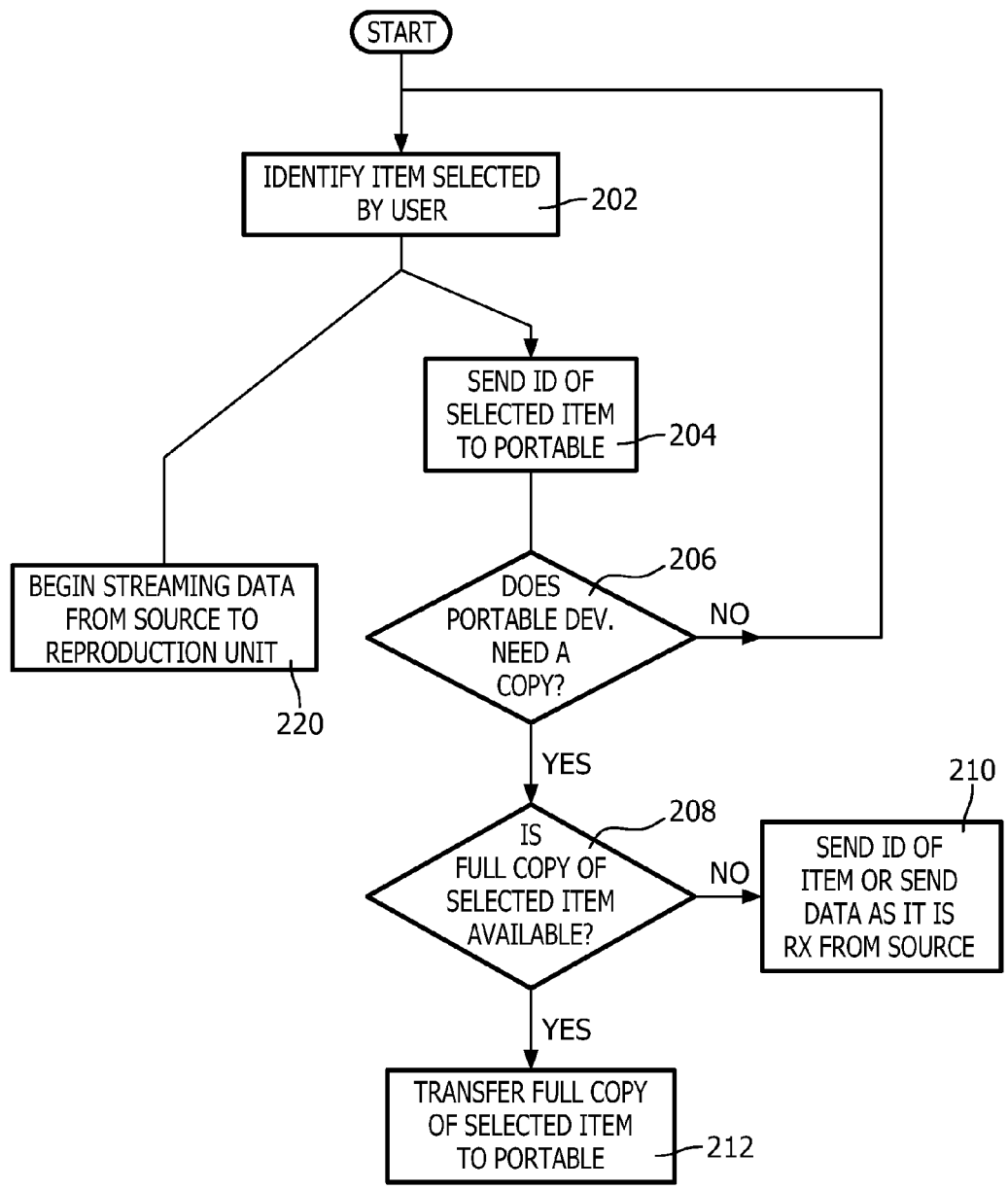
FIG. 3 shows a method performed at the media player of FIG. 1.
Figure 5:
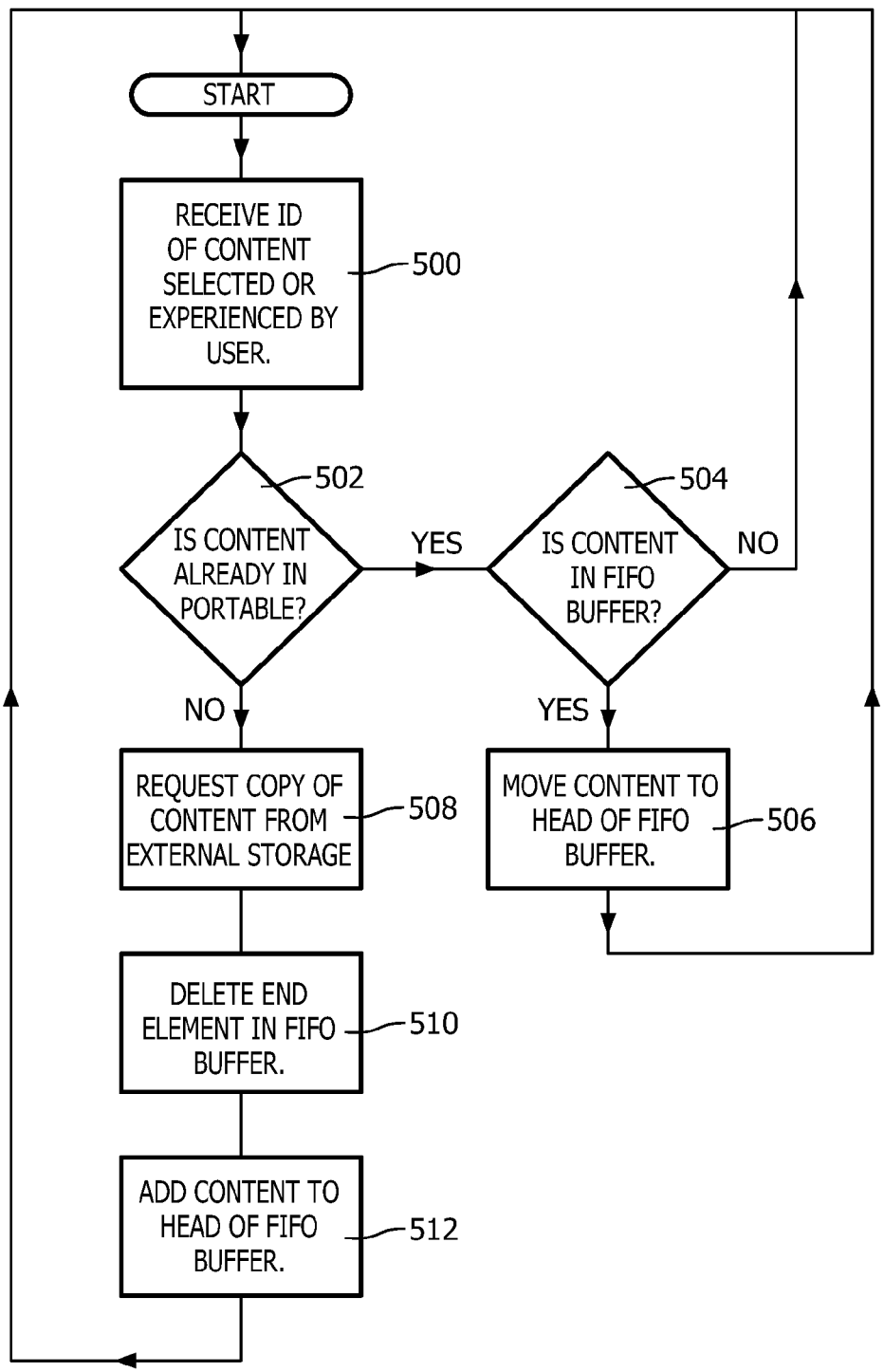
FIG. 5 shows a control method performed by the portable device of FIG. 1.

Firstly, FIG. 2 is a simplified version of the same system as FIG. 1 showing signalling and data flows between devices. FIG. 3 shows the steps performed by the controller 11 in the media device 10 while FIG. 5 shows corresponding steps performed by a controller 51 in the portable device 50.

A user selects an item of media content, or a channel of content, using remote control unit 80. A content selection signal (A) is transmitted from control unit 80 to media device 10. Controller 11 in the media device 10 responds to the selection signal by determining the source of that item (step 202), which will be storage device 20, optical disk player 21, broadcast receiver 22,23,24 or external server 25. Controller 11 initiates the rendering process (step 220). Data will be streamed (B) from the appropriate storage device 20, 21, 25 to the reproduction unit 15 at a controlled rate in a known manner. The reproduction unit 15 renders the data for the selected item of media content into a form suitable for presentation, supplying audio and/or video outputs to speakers 32 and display 34 so as to present the media content to the user. However, before normal reproduction begins, or at the same time as normal reproduction, the controller 11 also performs a series of steps to cause a copy of the selected item to be downloaded to the storage device 60 on the portable device 50. Firstly, there is an exchange of signalling information (C) between the controller 11 and the portable device 50 to determine whether the selected content already exists on the portable device 50. In this embodiment, controller 11 sends an identifier of the user-selected item of media content to the portable device 50 (step 204). The controller 51 of the portable device 50 checks an inventory to see whether a copy of the item of content already exists on the storage device of portable device 50 and informs the controller 11. If a copy is already stored on the portable device 50 then no data needs to be transferred. However, If a copy of the item is not already stored on the portable device 50 then the controller 11 determines whether a full copy of the selected item of media content is available (step 208). The process of determining whether a full copy of the selected item is available is explained in more detail below with reference to FIG. 6, suffice to say that if a full copy of the item is available, then this is transferred to the portable device 50 (step 212). It is preferred that the transfer to the portable device 50 is in the form of a file transfer (D) of the entire file of the item that the user has selected, delivered at a transfer rate which is significantly greater than the normal rate of streaming from the storage device to the reproduction unit 15. This ensures that the portable device 50 has a complete copy of the selected item in the event that the portable device 50 should be removed from the environment of the media device 10. As an example, a selected MP3 audio file may be delivered from the storage device 20 to the reproduction unit 15 at a streaming rate of 128 Kb/s, over a period of 4 minutes (the duration of the audio track), while the entire 3.75 MB audio file may be delivered to the storage device of the portable device 50, immediately after selection, at a rate of 2 Mb/s over a period of 15.4 seconds using a suitably high-bandwidth connection (an 802.11b WLAN connection) between the media device 10 and portable device 50.

Figure 4:
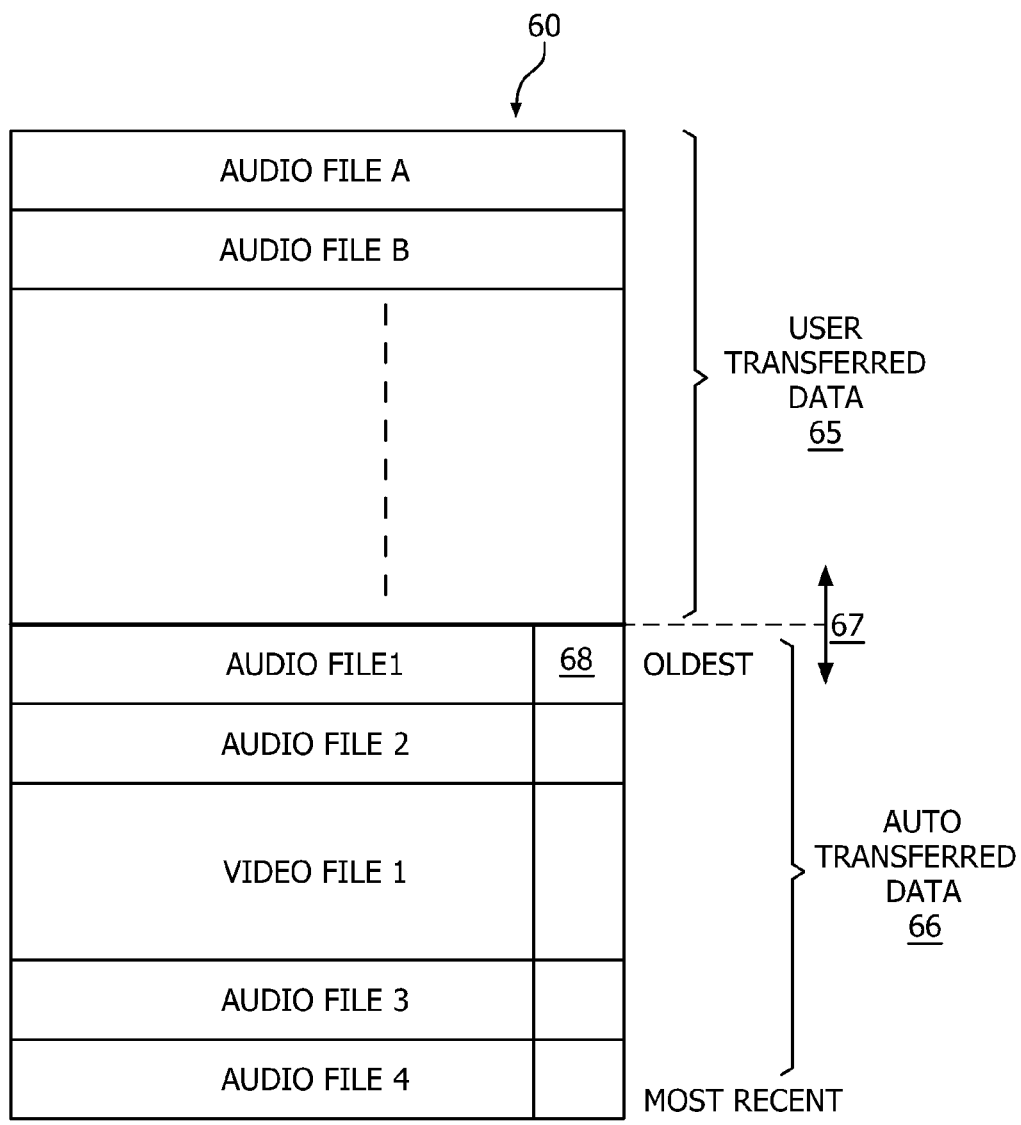
FIG. 4 shows a storage medium used in the portable device of FIG. 1.

FIG. 4 shows, in schematic form, a way of organising the storage device 60 on the portable device 50. A first part, 65, of the storage capacity is reserved for data that a user has specifically requested to be transferred to the portable device 50. In other words, this area is reserved for those items that a user specifies, by using the remote control 80 or the user interface on portable device 50, should be transferred to the portable device 50 in a conventional manner.

A second part, buffer 66, of the storage capacity is reserved for storing the automatically saved items of content. The portion of the total storage capacity which can be used in this way, defined by divider 67, can either be factory set or it can be user-defined as one of the user preferences of the portable device 50. Area 66 of the storage device 60 is operated in a First-In-First-Out manner. FIG. 3 shows four audio files and a video file stored in the FIFO, with audio file 1 being the oldest and audio file 4 being the most recently stored. As new data is added to the FIFO, audio file 1 will be the first to be deleted. If a user selects an item of media content on media device 10 which is already stored in the FIFO, then portable device 50 does not store a second copy but instead moves that item to the head of the FIFO list. This avoids the portable device 50 storing multiple copies of the same item in the limited storage area 66.

In a further refinement to the basic First-In-First-Out operation, a priority 68 can be assigned to each item in the buffer 66 and the priority is used to determine which items are deleted from the buffer 66. As an example, where a user specifies an item of content that they wish to listen to or view on media device 10, this is assigned a high priority whereas when a user simply selects a channel, such as a television channel, then a lower priority is assigned to any content on that channel as it is perceived that the content is of lower importance to the user. Other rules may either be factory set in the controllers 51, 11 or specified by a user according to their preferences. As a further example, audio tracks may be assigned a higher priority than video clips.

The contents of the storage buffer 66 can be displayed to the user on display 53, 58 in a chronological order or reverse chronological order. Alternatively, to present a coherent selection history, the temporarily buffered elements (audio files 1-3 and video file 1) may be interspersed with items of content stored more permanently on the portable device in part 65 of the storage device (audio files A, B). The selection history can also be arranged to list multiple references to a particular item, if the user has selected this on multiple occasions.

FIG. 5 shows a method by which the controller 51 in the portable device 50 decides whether a new item of media content, selected by a user on media device 10, needs to be stored. Firstly, at step 500, it is identified that a new item of media content has been selected by a user on the media device 10. In this embodiment this is triggered by receiving a message from the controller 11, as described above. At step 502 a determination is made of whether a copy of that content is already stored on the portable device 50, since if it is already stored on the portable device 50 then there is no need to download another copy. The controller 51 may consult an inventory of items stored on the storage device 60. If the item is already stored on the storage device 60 then a check is made at step 504 as to whether the item is stored in the user selected data area 65 or the temporary buffer 66. If it is in the buffer 66 then the item is moved to the head of the buffer and the priority of the item may also be raised. No further action is required. Moving back to step 502, if the item of media content is not already stored on the portable device 50 then a copy is requested from the media device 10, the oldest (lowest priority) element in the buffer 66 is deleted and the new item of media content is added to the head of buffer 66. Of course, if the buffer 66 has spare capacity, then there is no need to delete any items.

As noted above, the controller 11 aims, wherever possible, to copy each selected item of media content in it's entirety, rather than restricting transfer to the section of the item experienced by the user via media device 10. Thus, even if a user listens to a short extract of an audio track, the controller will transfer the entire audio file corresponding to that track to the portable device 50. It will be appreciated that where the item of media content is a source of broadcast or externally-sourced streamed content, the controller 11 may not be able to download a full copy of the selected item as it may not be available.

Figure 6:
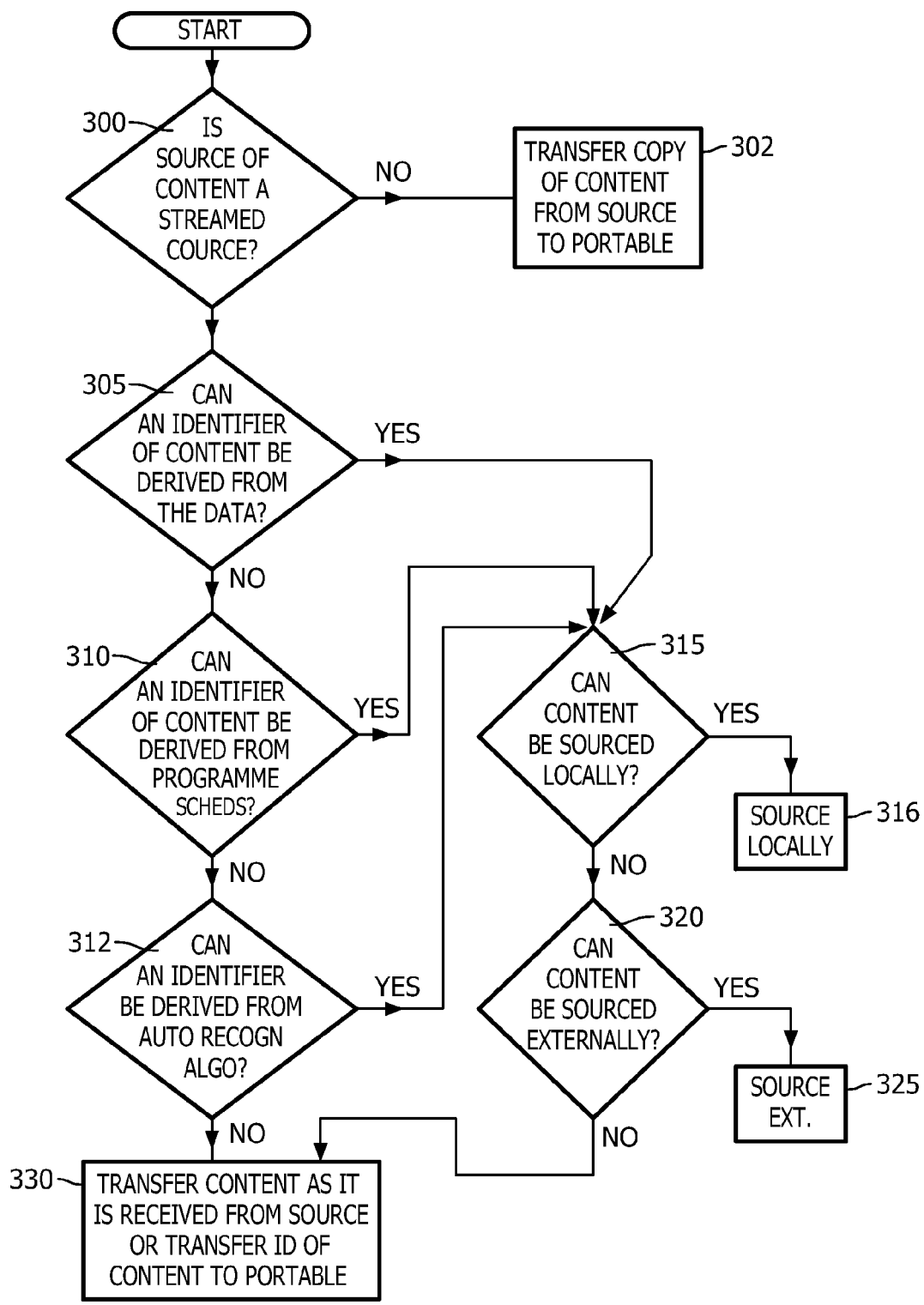
FIG. 6 shows a method for alternatively sourcing an item of media content.

FIG. 6 shows one of the strategies that controller 11 can adopt to deal with this situation. Firstly, at step 300, the controller 11 makes a determination of whether the source is a streamed source or a non-streamed source. Items of media content from a non-streamed source can be handled as previously described, at step 302. When the controller 11 determines that the source is a streamed source, it begins a series of tests to determine the identity of the item of media content. At step 305 the controller 11 determines whether an identifier of the item of media content can be derived from the data stream. As an example, if the item of content is a song which is being received, in a streamed manner, from an external broadcast radio station the controller will attempt to identify, from an identifier in the received data stream, the title of the song. The Programme Associated Data (PAD) feature of Digital Audio Broadcasting (DAB) provides the facility for transmitting a song title alongside broadcast audio data. If it is not possible to determine the identity of the item of media content then the controller proceeds to the next test, and consults programme schedules for the media channel. This test is likely to be most successful with broadcast video media such as television and films. If this test fails, the controller 11 may have the capability of using automatic recognition algorithms to determine the content.

If the result of any of the tests 305, 310, 312, yields an identification of the item of media content then the controller 11 can proceed to step 315 and determined whether the item can be sourced locally, from storage devices 20, 21. If the controller 11 determines at step 315 that a copy of the song is locally available then it can be quickly downloaded to the portable device 50 in the same manner as before, at step 316. Failing this, the controller 11 can consult, at step 320, external databases 25 to source an entire copy of the item. If the controller successfully locates an alternative source, then an entire copy of the item can be downloaded to the portable device 50 at step 325.

In the event that it is not possible to identify the content, or to access an alternative source of the content, then the controller 11 will cause the selected content to be copied to the portable device in synchrony with the rate at which it is received from the streamed source, at step 330. Alternatively, the controller 11 can send the portable device 50 an identifier of the item of media content (if that was determined), an identifier of the media channel or some other comment about the selected content which the portable device 50 can store alongside the other items in buffer 66. The controllers 11, 51 can be arranged to attempt to substitute a complete copy of the item at a later time or can simply leave the identifier in the buffer as a reference for the user when they view the selection history. As a still further alternative, the controller 51 can simply ignore any content for which a full copy or identifier is unavailable.

In the embodiment above, the decision as to whether the portable device 50 already has a copy of the selected item of media content is made in the controller 51 of the portable device 50. In an alternative embodiment of the invention, controller 11 in the media device 10 can decide whether to send a copy of a selected item of media content to the portable device 50. This requires controller 11 to maintain an up-to-date inventory of the contents of the storage device 60. This inventory can be acquired when the portable device 50 is first connected to the media device 10 (if the connection is cabled), or first registers with the media device 10 (if the connection is wireless).

In an alternative embodiment, controller 51 of the portable device 50 can assume more responsibility for the automatic copying of user-selected items of media content. In this alternative embodiment, controller 51 must regularly interrogate, or poll, each media device 10 in the local environment of the portable device 50 to determine what items of content are being selected by users of those devices 10, and to request that items are downloaded to the portable device 50 if those items are not already locally stored on storage device 60 of the portable device 50. The method is similar to that already illustrated in FIG. 5 with the addition that, at step 500, the portable device 50 actively interrogates local media devices 10 to determine the media content that users are experiencing on those other machines rather than being informed every time a new item is selected by a user.

In a still further embodiment of the invention, controller 81 in the remote control unit 80 can assume the majority of the control intelligence for the overall system and controller 11 in media device 10 (and controller 51 in portable device 50) react to instructions from controller 81.

Although the invention just described is useful where the portable storage device 50 is connected to a single AV device, the convenience is greatly increased where a number of portable devices are connected together in the form of a home network and the portable device 50 forms connections with multiple AV devices. Ideally, the portable device 50 receives a copy of content from any of the AV devices in the home network that the user interacts with.

The home network can comprise items of dedicated equipment, such as a DVD player, broadcast receiver, or multi-functional machines such as one or more personal computers. In the case of a personal computer, the media content can be stored on hard disks, coding/decoding can be performed by suitable software codecs and even the final output and user interface can be delivered, if desired, by using the keyboard, display and audio speakers of the computer.

It is preferred that the media device 10, portable device 50 and remote control unit 80 are all based on the Universal Plug and Play (UPnP) architecture, as this architecture lends itself to this type of environment where devices are added and removed from the home network (such as when a user brings the portable device 50 into range of the media device 10 or removes it). The AV extensions to the UPnP specification define a Control Point, Media Server and Media Renderer as particular types of UPnP devices. In this invention, content is transferred from the media device 10 (a first UPnP Media Server) to the portable device 50 (a second UPnP Media Server) under the direction of the controller 11 (a UPnP Control Point). Further features of UPnP also readily lend themselves to implementing this invention. UPnP defines a Content Directory Service (CDS) for Media Servers, which equates to the inventory described, processes of 'Import Resource' and 'Export Resource' for copying content between Media Servers and a 'Create Object' process for registering new content with a Media Server.

As previously described, since portable devices 50 are likely to be disconnected from other AV devices without warning, content should be copied to the portable device 50 as quickly as possible once it has been selected. This ensures that the selected item is available for continuation of playback if the user decides to switch to their portable device. This switch of rendering source from 'home' to portable storage could also be initiated automatically, if the portable device was disconnected. One way of achieving this would be for the controller 11 to periodically notify the portable device 50 of the position at which the selected item of media content is currently being rendered. This position can be stored as an additional field alongside the media content in buffer 66 or as a separate element in storage 60. In the event that the portable device 50 is removed from the media device 10 then the portable device 50 can consult the relevant element in storage 60 to determine the last known position at which the media device 10 was rendering the item of media content and use this to begin rendering the same content, which is locally stored in part 65 or 66 of the storage device 60.

Although not shown here, it is possible for the remote control 80 and portable device 50 to be combined, or even for the functions of the remote control 80, portable device 50 and controller 51 to be combined such that the control means for operating the both the home and portable storage and rendering systems are incorporated into one unit.

The storage device 60 of the portable device 50 can be an integral part of the device 50 or it may be a removable unit.

It will be appreciated that communication between the portable device 50 and media device 10 can be achieved using either a wireless connection, as described, or a cabled connection such as a Universal Serial Bus (USB) connection. Similarly, elements of the home network can either be connected by cables or in a wireless fashion, the elements forming a wireless LAN, such as an 802.11b LAN.

The invention claimed is:

1. A control apparatus for a portable device for storing media content, the portable device having a storage medium for storing media content and means for communicating with a media player external to the portable device, the control apparatus being arranged to:
   determine when a user selects a new item of media content for rendering by the external media player; and
   cause a copy of the user-selected media content to be transferred to the portable player and stored on the storage medium of the portable device,
wherein the control apparatus is further arranged to:
   determine whether a copy of the user-selected media content is already stored on the portable device; and
   periodically poll the external media player to determine when the user has selected a new item of media content for rendering by the external media player.

2. The control apparatus as claimed in claim 1, wherein the control apparatus is further arranged to:
   only store a copy of the user-selected media content if a copy is not already stored on the portable device.

3. A control apparatus for a portable device for storing media content, the portable device having a storage medium for storing media content and means for communicating with a media player external to the portable device, the control apparatus being arranged to:
   determine when a user selects a new item of media content for rendering by the external media player; and
   cause a copy of the user-selected media content to be transferred to the portable player and stored on the storage medium of the portable device,
wherein the control apparatus is further arranged to:
   determine whether a copy of the user-selected media content is already stored on the portable device,
wherein the control apparatus is further arranged to:
   transfer a complete copy of the user-selected item of media content, regardless of the amount of that item sampled by the user on the external media player.

4. A control apparatus for a portable device for storing media content, the portable device having a storage medium for storing media content and means for communicating with a media player external to the portable device, the control apparatus being arranged to:
   determine when a user selects a new item of media content for rendering by the external media player; and
   cause a copy of the user-selected media content to be transferred to the portable player and stored on the storage medium of the portable device,
wherein the control apparatus is further arranged to:
   determine whether a copy of the user-selected media content is already stored on the portable device,
wherein the control apparatus is further arranged to:
   transfer the user-selected media content at a rate which is greater than that at which the user-selected media content is rendered on the external media player.

5. A control apparatus for a portable device for storing media content, the portable device having a storage medium for storing media content and means for communicating with a media player external to the portable device, the control apparatus being arranged to:
   determine when a user selects a new item of media content for rendering by the external media player; and
   cause a copy of the user-selected media content to be transferred to the portable player and stored on the storage medium of the portable device,
wherein the control apparatus is further arranged to:
   determine whether a copy of the user-selected media content is already stored on the portable device, wherein the storage medium comprises a temporary buffer for storing a limited number of items of media content, and wherein the control apparatus is arranged to store the items in the temporary buffer on a time ordered basis.

6. The control apparatus as claimed in claim 5, wherein the control apparatus is further arranged to:
   store the items in the temporary buffer on a first-in, first-out basis.

7. The control apparatus as claimed in claim 5, wherein the control apparatus is further arranged to:

determine whether a copy of the user-selected media content is already stored on the portable device and, if so, the longevity of that item in the temporary buffer is increased.

8. A control apparatus for a portable device for storing media content, the portable device having a storage medium for storing media content and means for communicating with a media player external to the portable device, the control apparatus being arranged to:
   determine when a user selects a new item of media content for rendering by the external media player; and
   cause a copy of the user-selected media content to be transferred to the portable player and stored on the storage medium of the portable device,
wherein the control apparatus is further arranged to:
   determine whether a copy of the user-selected media content is already stored on the portable device,
wherein the storage medium comprises a temporary buffer for storing a limited number of items of media content, and wherein the control apparatus is arranged to assign a priority to items stored in the temporary buffer.

9. The control apparatus as claimed in claim 8, wherein the priority of an item is dependent on the type of media content.

10. The control apparatus as claimed in claim 8, wherein the priority of an item is dependent on whether that item was selected by a user on the external media player.

11. A control apparatus for a portable device for storing media content, the portable device having a storage medium for storing media content and means for communicating with a media player external to the portable device, the control apparatus being arranged to:
   determine when a user selects a new item of media content for rendering by the external media player; and
   cause a copy of the user-selected media content to be transferred to the portable player and stored on the storage medium of the portable device,
wherein the control apparatus is further arranged to:
   determine whether a copy of the user-selected media content is already stored on the portable device,
wherein the portable device further comprises means for rendering media content stored in the storage medium, and the control apparatus is operable to determine when the portable device is removed from the external media player and to begin rendering the media content which had been selected on the external media player.

12. The control apparatus as claimed in claim 11, wherein the control apparatus is further arranged to:
   determine the position at which the external media player was rendering the selected media content at the time that the portable device was disconnected, and to begin rendering the media content on the portable device at substantially the same position.

13. A control apparatus for a portable device for storing media content, the portable device having a storage medium for storing media content and means for communicating with a media player external to the portable device, the control apparatus being arranged to:
   determine when a user selects a new item of media content for rendering by the external media player; and
   cause a copy of the user-selected media content to be transferred to the portable player and stored on the storage medium of the portable device,
wherein the control apparatus is further arranged to:
   determine whether a copy of the user-selected media content is already stored on the portable device,
wherein the control apparatus is further arranged to:
   control operation of the external media player.

14. A control apparatus for a media player which is capable of rendering media content for a user, the media player being co-operable with a portable device having a storage medium for storing media content, and having means for communicating with the portable device, the control apparatus being arranged to:
   determine when a user selects a new item of media content for rendering by the media player; and
   cause a copy of the user-selected media content to be transferred to the portable device and stored on the storage medium of the portable device,
wherein the control apparatus further comprises inventory means for storing an inventory of media content stored on the storage medium of the portable device, and wherein the control apparatus is arranged to cause a copy of the selected item of media content to be automatically copied to and stored on the storage medium of the portable device only if the selected item does not appear in the inventory means,
wherein the control apparatus is arranged, in response to determining that a user has selected a new item of media content, to send the portable device an identifier of the new item, and
wherein the control apparatus is arranged to cause a copy of the new item to be transferred to and stored on the storage medium of the portable device only if the portable device requests a copy of the new media content.

15. A control apparatus for a media player which is capable of rendering media content for a user, the media player being co-operable with a portable device having a storage medium for storing media content, and having means for communicating with the portable device, the control apparatus being arranged to:
   determine when a user selects a new item of media content for rendering by the media player; and
   cause a copy of the user-selected media content to be transferred to the portable device and stored on the storage medium of the portable device,
wherein the control apparatus further comprises inventory means for storing an inventory of media content stored on the storage medium of the portable device, and wherein the control apparatus is arranged to cause a copy of the selected item of media content to be automatically copied to and stored on the storage medium of the portable device only if the selected item does not appear in the inventory means,
wherein the control apparatus is further arranged to:
   transfer and store a complete copy of the user-selected item of media content on the storage medium of the portable device, regardless of the amount of that item sampled by the user on the media player.

16. A control apparatus for a media player which is capable of rendering media content for a user, the media player being co-operable with a portable device having a storage medium for storing media content, and having means for communicating with the portable device, the control apparatus being arranged to:
   determine when a user selects a new item of media content for rendering by the media player; and
   cause a copy of the user-selected media content to be transferred to the portable device and stored on the storage medium of the portable device,
wherein the control apparatus further comprises inventory means for storing an inventory of media content stored on the storage medium of the portable device, and wherein the control apparatus is arranged to cause a copy of the selected item of media content to be automatically copied to and stored on the storage medium of the portable device only if the selected item does not appear in the inventory means, wherein the control apparatus is further arranged to:
  transfer the user-selected media content at a rate which is greater than that at which the user-selected media content is rendered by the media player.

17. The control apparatus as claimed in claim 15, wherein the control apparatus is further arranged to:
  determine whether a complete copy of the user-selected item of media content is available.

18. The control apparatus as claimed in claim 17, wherein the control apparatus is further arranged to:
  determine whether a complete copy of the user-selected item of media content is available from an alternative source to that currently being used.

19. The control apparatus as claimed in claim 18, wherein the control apparatus is further arranged, in the event that an alternative source cannot be found, to copy the user-selected item of media content to the portable device at substantially the same rate at which it is received by, or rendered on, the media player.

20. A media player comprising means for storing or receiving items of media content, means for rendering items of media content for a user, and a control apparatus for the media player, the media player being co-operable with a portable device having a storage medium for storing media content, and having means for communicating with the portable device, the control apparatus being arranged to:
  determine when a user selects a new item of media content for rendering by the media player; and
  cause a copy of the user-selected media content to be transferred to and stored on the storage medium of the portable device,
wherein the control apparatus further comprises inventory means for storing an inventory of media content stored on the storage medium of the portable device, and wherein the control apparatus is arranged to cause a copy of the selected item of media content to be automatically copied to and stored on the storage medium of the portable device only if the selected item does not appear in the inventory means,
wherein the control apparatus is arranged, in response to determining that a user has selected a new item of media content, to send the portable device an identifier of the new item, and
wherein the control apparatus is arranged to cause a copy of the new item to be transferred to and stored on the storage medium of the portable device only if the portable device requests a copy of the new media content.

21. A media system comprising:
  a media player capable of rendering media content for a user;
  a portable device having a storage medium for storing media content;
  the media player and portable device having means for communicating with each other;
  means for determining when a user selects a new item of media content for rendering by the media player; and
  means for sending a copy of the user-selected media content to the portable device and for storing the copy on the storage medium of the portable device,
wherein the media player further comprises inventory means for storing an inventory of media content stored on the storage medium of the portable device, and wherein the media player is arranged to cause a copy of the selected item of media content to be automatically copied to and stored on the storage medium of the portable device only if the selected item does not appear in the inventory means,
wherein the media player is arranged, in response to determining that a user has selected a new item of media content, to send the portable device an identifier of the new item, and
wherein the media player is arranged to cause a copy of the new item to be transferred to and stored on the storage medium of the portable device only if the portable device requests a copy of the new media content.

22. A method of controlling operation of a portable device for storing media content, the portable device having a storage medium for storing the media content, and means for communicating with a media player external to the portable device, the method comprising the steps of:
  determining when a user selects a new item of media content for rendering by the external media player;
  determining whether a copy of the user-selected media content is already stored on the portable device and
  causing a copy of the user-selected media content to be transferred to and stored on the storage medium of the portable device,
wherein said method further comprises the steps of:
  in response to determining that a user has selected a new item of media content, sending to the portable device an identifier of the new item; and
  causing a copy of the new item to be transferred to and stored on the storage medium of the portable device only if the portable device requests a copy of the new media content.

23. A method of controlling a media player which is capable of presenting media content to a user, the media player being co-operable with a portable device having a storage medium for storing media content, and having means for communicating with the portable device, the method comprising the steps of:
  determining when a user selects a new item of media content for rendering by the media player;
  storing an inventory of media content stored on the storage medium of the portable device; and
  causing a copy of the selected item of media content to be automatically copied to and stored on the storage medium of the portable device only if the selected item does not appear in the inventory,
wherein said method further comprises the steps of:
  in response to determining that a user has selected a new item of media content, sending to the portable device an identifier of the new item; and
  causing a copy of the new item to be transferred to and stored on the storage medium of the portable device only if the portable device requests a copy of the new media content.

* * * * *